US012602170B2

(12) United States Patent
Wang et al.

(10) Patent No.: US 12,602,170 B2
(45) Date of Patent: Apr. 14, 2026

(54) WRITE BUFFER FLUSH TECHNIQUES

(71) Applicant: Micron Technology, Inc., Boise, ID (US)

(72) Inventors: Xiao Wang, Shanghai (CN); Xiaolai Zhu, Shanghai (CN); Wenyu Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 18/701,904

(22) PCT Filed: Mar. 14, 2023

(86) PCT No.: PCT/CN2023/081334
§ 371 (c)(1),
(2) Date: Apr. 16, 2024

(87) PCT Pub. No.: WO2024/187373
PCT Pub. Date: Sep. 19, 2024

(65) Prior Publication Data
US 2025/0224882 A1 Jul. 10, 2025

(51) Int. Cl.
*G06F 3/06* (2006.01)
(52) U.S. Cl.
CPC .......... *G06F 3/0619* (2013.01); *G06F 3/0659* (2013.01); *G06F 3/0683* (2013.01)
(58) Field of Classification Search
CPC ..... G06F 3/0619; G06F 3/0659; G06F 3/0683
USPC ........................................................ 711/154
See application file for complete search history.

(56) References Cited

U.S. PATENT DOCUMENTS

| | | | |
|---|---|---|---|
| 11,409,462 B2 | 8/2022 | Li et al. | |
| 2017/0177235 A1* | 6/2017 | Nishikubo | .......... G11C 11/5628 |
| 2019/0107964 A1 | 4/2019 | Liang et al. | |
| 2022/0229555 A1* | 7/2022 | Sela | ..................... G06F 3/0679 |

(Continued)

FOREIGN PATENT DOCUMENTS

| | | |
|---|---|---|
| CN | 114365097 A | 4/2022 |
| WO | 2022/120517 A1 | 6/2022 |

OTHER PUBLICATIONS

"International Search Report and Written Opinion of the International Searching Authority," issued in connection with Int'l Appl. No. PCT/CN2023/081334, dated Jun. 13, 2023 (7 pages).

*Primary Examiner* — Than Nguyen
(74) *Attorney, Agent, or Firm* — Holland & Hart LLP

(57) ABSTRACT

Methods, systems, and devices for write buffer flush techniques are described. A memory system may be triggered to flush (e.g., transfer, write) data from a volatile memory device to a non-volatile memory device of the memory system. The memory system may support flushing data to blocks including single level cells (SLCs) or blocks including multiple-level memory cells. The memory system may determine whether a quantity of the data to be flushed satisfies a threshold quantity of data. If the quantity of data fails to satisfy the threshold quantity of data, the memory system may flush the data to a block including SLCs, which may be referred to as a small chunk SLC cursor. The SLC cursor may temporarily store the flushed data, such as at least until the threshold quantity of data is satisfied in the volatile memory device and/or to data recovery in case of a power loss event.

18 Claims, 5 Drawing Sheets

(56) References Cited

U.S. PATENT DOCUMENTS

| | | | |
|---|---|---|---|
| 2023/0143181 A1* | 5/2023 | Tan ........................ | G06F 3/0656 |
| | | | 711/103 |
| 2023/0229347 A1* | 7/2023 | Zilberstein .............. | G06F 3/068 |
| | | | 711/154 |

* cited by examiner

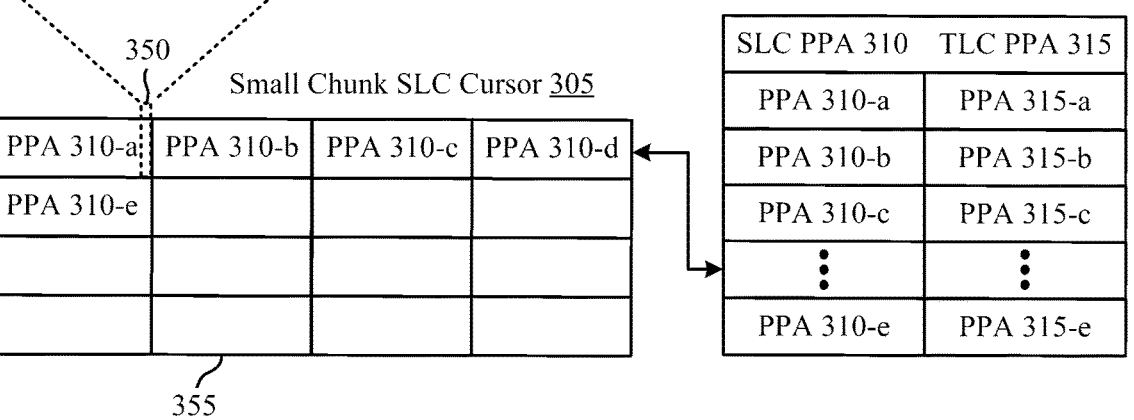

Small Chunk SLC Cursor Table 320

| SLC PPA 310 | TLC PPA 315 |
|---|---|
| PPA 310-a | PPA 315-a |
| PPA 310-b | PPA 315-b |
| PPA 310-c | PPA 315-c |
| ⋮ | ⋮ |
| PPA 310-e | PPA 315-e |

365-a, 365-b, 365-c, 365-e

340

Small Chunk SLC Cursor Table 320

| SLC PPA 310 | TLC PPA 315 |
|---|---|
|  |  |
|  |  |
|  |  |
|  |  |
|  |  |

345

| PPA 315-a | LBA 330-a |
|---|---|

350

Small Chunk SLC Cursor 305

| PPA 310-a | PPA 310-b | PPA 310-c | PPA 310-d |
|---|---|---|---|
| PPA 310-e |  |  |  |
|  |  |  |  |
|  |  |  |  |

355

Small Chunk SLC Cursor Table 320

| SLC PPA 310 | TLC PPA 315 |
|---|---|
| PPA 310-a | PPA 315-a |
| PPA 310-b | PPA 315-b |
| PPA 310-c | PPA 315-c |
| ⋮ | ⋮ |
| PPA 310-e | PPA 315-e |

TLC Cursor 325

| PPA 315-a | PPA 315-b | PPA 315-c | PPA 315-d |
|---|---|---|---|
| PPA 315-e |  |  |  |
|  |  |  |  |
|  |  |  |  |

360

Change Log 335

| LBA 330 | TLC PPA 315 |
|---|---|
| LBA 330-a | PPA 315-a |
| LBA 330-b | PPA 315-b |
| LBA 330-c | PPA 315-c |
| ⋮ | ⋮ |
| LBA 330-e | PPA 315-e |

370-a, 370-b, 370-c, 370-e

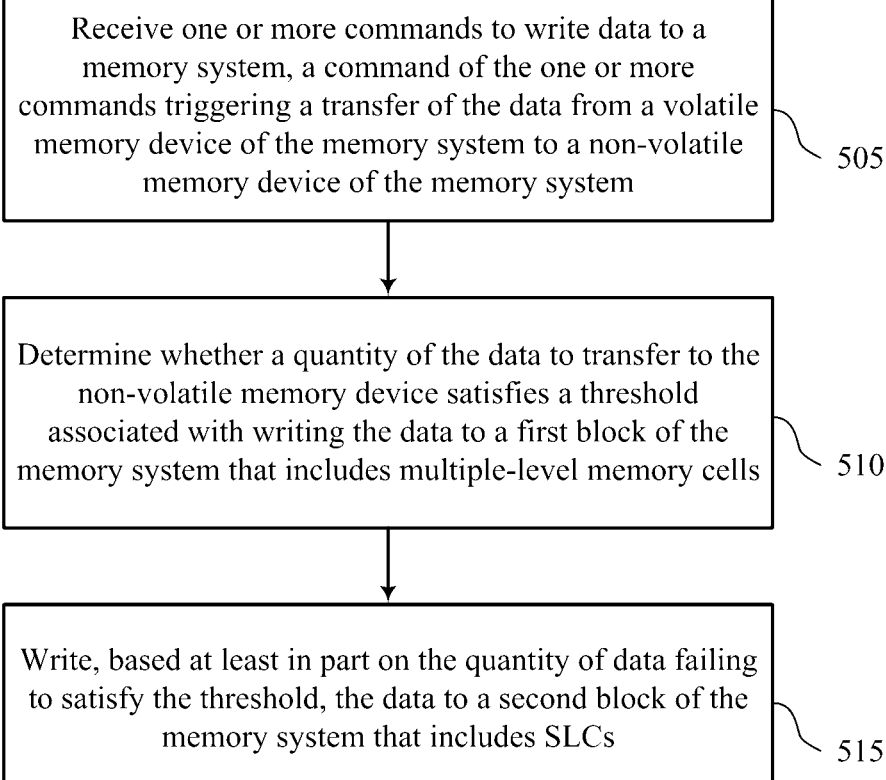

Receive one or more commands to write data to a memory system, a command of the one or more commands triggering a transfer of the data from a volatile memory device of the memory system to a non-volatile memory device of the memory system

505

Determine whether a quantity of the data to transfer to the non-volatile memory device satisfies a threshold associated with writing the data to a first block of the memory system that includes multiple-level memory cells

510

Write, based at least in part on the quantity of data failing to satisfy the threshold, the data to a second block of the memory system that includes SLCs

WRITE BUFFER FLUSH TECHNIQUES

CROSS REFERENCE

The present Application for Patent is a 371 national phase filing of International Patent Application No. PCT/CN2023/081334 by Wang et al., entitled "WRITE BUFFER FLUSH TECHNIQUES," filed Mar. 14, 2023, assigned to the assignee hereof, and expressly incorporated by reference in its entirety herein.

TECHNICAL FIELD

The following relates to one or more systems for memory, including write buffer flush techniques.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 3 shows an example of a that supports write buffer flush techniques in accordance with examples as disclosed herein.

FIG. 5 shows an example of a flowchart that supports write buffer flush techniques in accordance with examples as disclosed herein.

DETAILED DESCRIPTION

Figure 1:
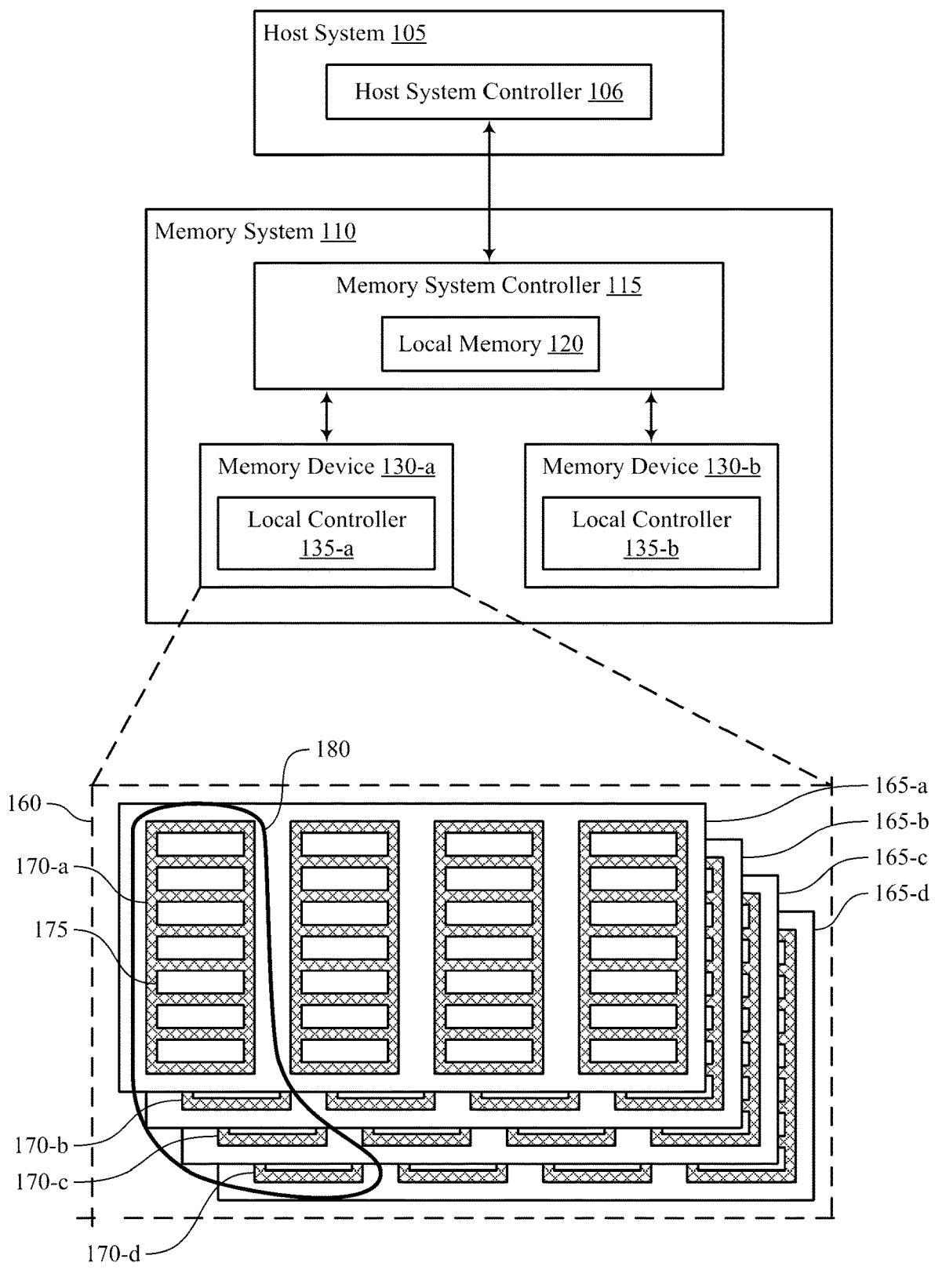
FIG. 1 shows an example of a system that supports write buffer flush techniques in accordance with examples as disclosed herein.

A memory system may include volatile memory (e.g., a buffer, static random access memory (SRAM)), such as included in a memory system controller, that may be used to temporarily store data communicated between a host system and a memory device of the memory system. The memory system may include cursors (e.g., blocks of memory cells, such as a block or a virtual block), which may include various types of memory cells to which the data may be flushed. In some examples, the memory system may flush (e.g., write, transfer) the data to a cursor including multiple-level memory cells (e.g., a tri-level cell (TLC) cursor, among others) which may be more storage efficient, for example, relative to writing the data to a cursor including single level cells (SLCs). In some cases, the memory system may support writing a threshold (e.g., minimum) quantity of data to the multiple-level cell cursor per flush operation. As such, the memory system may buffer (e.g., accumulate, aggregate) at least the threshold quantity of data in the volatile memory before flushing the data to the multiple-level cell cursor. In some examples, the host system may initiate an operation that may trigger (e.g., force) a flush of the data to non-volatile memory of the memory system before the threshold is satisfied (e.g., met, reached). In some cases, the memory system may pad the buffered data with dummy data such that the threshold may be satisfied and may flush the padded data to the cursor. However, padding the buffered data with dummy data may decrease the storage efficiency of the memory system and may increase a total bytes written (TBW), which may be a measure of an aging of the memory system and lead to more rapid overall wear (e.g., increase a rate of degradation) of the memory system.

Techniques, systems, and devices are described herein for increasing memory system performance and storage efficiency, while reducing memory system wear by implementing a small chunk cursor (e.g., for which no logical-to-physical (L2P) mapping information is generated) that supports the writing of smaller quantities of data at a time. For example, if the memory system is triggered to flush a buffer (e.g., a volatile memory device) before the buffer includes (e.g., stores) the threshold quantity of data, the memory system may flush the data to a cursor (e.g., block) including SLCs, which may be referred to as a small chunk cursor (e.g., a small chunk SLC cursor), instead of flushing the data to the multiple-level cell cursor. The flushed data may be maintained in the buffer as additional data is received, such as until the threshold quantity of data is reached. The threshold quantity of data, including the flushed data, may be flushed to the multiple-level cell cursor and L2P mapping information may be updated to indicate the location of the threshold quantity of data in the multiple-level cell cursor. Because the data is maintained and eventually flushed to the multiple-level cell cursor, padding the data with dummy data may be avoided in association with flushing the data to the multiple-level cell cursor from the buffer while complying with a triggered flush to non-volatile memory, thereby reducing wear experienced by multiple-level cell cursors and increasing storage efficiency, among other benefits. Additionally, the flushing of the buffered data to the SLC cursor may support data recovery. For example, if an asynchronous power loss (APL) occurs after flushing the buffered data to the SLC cursor and before the threshold quantity of data is stored in the buffer, the data may be recovered from the SLC cursor and written to the multiple-level cell cursor, as described herein.

Features of the disclosure are initially described in the context of systems and devices with reference to FIG. 1. Features of the disclosure are described in the context of write buffer flush techniques with reference to FIGS. 2 and 3. These and other features of the disclosure are further illustrated by and described in the context of an apparatus diagram and flowchart that relate to write buffer flush techniques with reference to FIGS. 4 and 5.

FIG. 1 shows an example of a system 100 that supports write buffer flush techniques in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as multi-level cells (MLCs) if configured to each store two bits of information, as TLCs if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

In some examples, a pageline may refer to a single row of pages 175 of a virtual block 180. For example, a pageline corresponding to a first row of a virtual block 180 may include the first page 175 of each block 170 of a group of blocks 170 included in the virtual block 180.

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained, and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support write buffer flush techniques. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may include cursors (e.g., blocks 170, virtual blocks 180), which may include various types of memory cells (e.g., SLCs, MLCs, TLCs, QLCs) to which data may be written. In some examples, the memory system controller 115 may flush host data stored in the local memory 120 to a cursor including multiple-level memory cells (e.g., a TLC cursor) to increase storage efficiency, such as relative to flushing the host data to an SLC cursor. In some cases, the memory system controller 115 may support flushing a threshold (e.g., minimum) quantity of data to the cursor at a time and may buffer (e.g., accumulate) at least the threshold quantity of data in the local memory 120 before flushing the data to the multiple-level cell cursor. In some examples, however, the memory system controller 115 may be triggered to flush the host data to non-volatile memory (e.g., one or more of the memory devices 130) of the memory system 110 before the data threshold is met. In some cases, the memory system controller 115 may pad the buffered data with dummy data such that the threshold may be met and may flush the padded data to the cursor. However, padding the buffered data with dummy data may decrease the storage efficiency of the memory system 110 and may increase wear of the memory system 110.

Techniques, systems, and devices are described herein for increasing the performance and efficiency of the memory system 110, while reducing wear of the memory system 110 by using a small chunk SLC cursor. For example, if the memory system controller 115 is triggered to flush host data from the local memory 120 before the threshold quantity of data is satisfied, the memory system controller 115 may flush (e.g., write, transfer) the data to the small chunk SLC cursor instead of padding and flushing the data to the multiple-level cell cursor. The flushed data may be maintained in the local memory 120 as additional data is received, such as until the threshold quantity of data is reached. The memory system controller 115 may flush threshold quantity of data, including the data flushed to the SLC cursor and maintained in the local memory 120, to the multiple-level cell cursor and update (e.g., generate) L2P mapping information to indicate the location of the threshold quantity of data in the multiple-level cell cursor. Because the data is maintained and eventually flushed to the multiple-level cell cursor, padding the data with dummy data may be avoided in association with flushing the data to the multiple-level cell cursor from the buffer while complying with a triggered flush to non-volatile memory, thereby reducing wear experienced by multiple-level cell cursors and increasing storage efficiency, among other benefits. Additionally, the flushing of the buffered data to the SLC cursor may support data recovery. For example, if an APL event occurs after flushing the data to the SLC cursor and before the threshold quantity of data is stored in the local memory 120, the memory system controller 115 may recover the data from the SLC cursor along with mapping information to the multiple-level cell cursor and write the data to the multiple-level cell cursor, as described with reference to FIG. 3.

In addition to applicability in memory systems as described herein, write buffer flush techniques may be generally implemented to improve the performance of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by improving read performance in the devices (such as by supporting the consolidation of data into a single cursor for reading), which may improve user experience, among other benefits. Additionally, implementing the techniques described herein may extend the life of the devices, such as by decreasing a TBW of the devices, wear experienced by multiple-level cursors, or a combination thereof, which reduce electronic waste.

Figure 2:
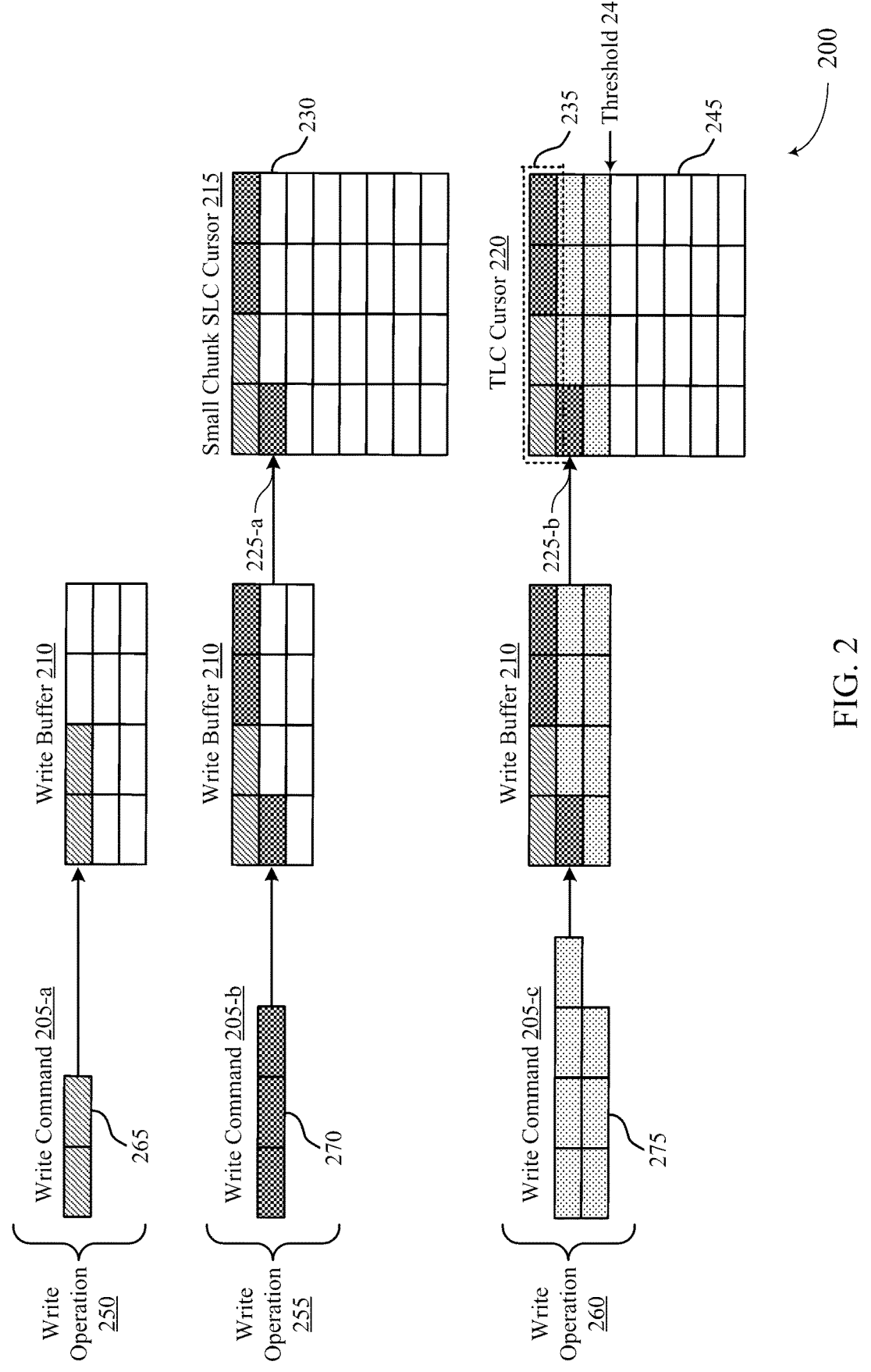
FIG. 2 shows an example of a techniques that supports write buffer flush techniques in accordance with examples as disclosed herein.

FIG. 2 shows an example of a program diagram 200 that supports write buffer flush techniques in accordance with examples as disclosed herein. The program diagram 200 may be implemented by the system 100 as described with reference to FIG. 1, or aspects thereof. For example, the program diagram 200 may be implemented by a memory system controller of a memory system, which may be an example of the memory system controller 115 as described with reference to FIG. 1. The memory system controller may include a write buffer 210 (e.g., a volatile memory device, such as a local memory 120 including SRAM), which may receive and store data associated with write commands 205 from a host system (e.g., a host system 105). The memory system may also include one or more small chunk SLC cursors 215 (e.g., cursors including SLCs) and one or more multiple-level cursors (e.g., cursors including multiple-level memory cells), which may be examples of one or more of the blocks 170 or the virtual blocks 180 as described with reference to FIG. 1. In the example of FIG. 2, the memory system may include a TLC cursor 220 (e.g., a cursor including TLCs), although other types of multiple-level memory cell cursors, or combinations of different types of multiple-level memory cell cursors are possible.

The memory system controller may use the write buffer 210 to temporarily store data communicated between the host system and a memory device (e.g., a memory device 130) of the memory system, such as part of a write operation (e.g., a write operation 250, a write operation 255, a write operation 260). For example, the memory system controller may receive one or more of the write commands 205 from the host system to write associated data (e.g., data 265, 270, 275) to the memory device and may store the data in the write buffer 210.

The small chunk SLC cursor 215 and the TLC cursor 220 may include pages and pagelines. For example, the small chunk SLC cursor 215 may include one or more of the pages 230, and the TLC cursor 220 may include one or more of the pages 245, which may be examples of pages 175 described with reference to FIG. 1. Each page may include a "spare" (e.g., a spare 350 described with reference to FIG. 3), which may be a portion of the page (e.g., a 16 byte portion of the page, among other storage quantities) used to store metadata (e.g., LBA, a physical page address (PPA)) associated with the page (e.g., data stored to the page). A pageline may refer to a single row of pages of a virtual block, such as including a same page (e.g., a page having a same index or relative location) within each plane (e.g., plane 165) of one or more dies (e.g., dies 160). For example, pages 245 included in a pageline 235 of the TLC cursor 220 may correspond to a row of pages 245 of the TLC cursor 220. The SLC cursor 215 and the TLC cursor 220 may be data structures stored in a non-volatile memory device (e.g., a NAND memory device). The write buffer 210 may be a data structure stored in a volatile memory device (e.g., SRAM). Thus, in the event of an APL, data stored in the write buffer 210 may be lost while data stored in the SLC cursor 215 or the TLC cursor 220 will likely be preserved.

The memory system controller may flush data stored in the write buffer 210 to one of the associated cursors. For example, a flush indication may be received to flush data from the write buffer 210, or a flush 225 may otherwise be triggered, and the memory system controller may write (e.g., transfer, duplicate) the stored data in the write buffer 210 to the small chunk SLC cursor 215 (e.g., a flush 225-a) or to the TLC cursor 220 (e.g., as a flush 225-b). Examples of a flush indication or trigger may include at least a threshold quantity of data being stored in the write buffer 210 (e.g., based on reception of one or more write commands 205), a force unit access (FUA) command (e.g., write command 205 including an FUA field set to true), a cache flush command, an L2P table update (such as in response to a change log becoming full), or some other command or trigger to flush data from the write buffer 210 to non-volatile memory of the memory system.

The program diagram 200 shows various write operations that may be performed by the memory system including the flushing of data from the write buffer 210 in accordance with examples described herein. As part of a write operation 250, the memory system controller may receive a write command 205-a from the host system to write data 265 to the memory system. In response to receiving the write command 205-a, the memory system controller may store the data 265 included in the write command 205-a to the write buffer 210. The memory system controller be configured to maintain data in the write buffer 210 before flushing (e.g., writing, transferring) the data to non-volatile memory until the memory system controller is able to write the data to the TLC cursor 220. For example, the TLC cursor 220 may be associated with a threshold 240 corresponding to a granularity at which the memory system controller supports writing to the TLC cursor 220. For instance, the threshold 240 may correspond to a minimum quantity of data that the memory system controller may flush to the TLC cursor per flush 225 (e.g., a minimum quantity of data that is transferrable to the TLC cursor per transfer from the write buffer 210). In some examples, the threshold 240 may correspond to a quantity of data storable by a quantity of pagelines 235 of the TLC cursor, such as the quantity of data that may be stored by three pagelines 235 of the TLC cursor, among other quantities of pagelines. The quantity of data 265 may fail to satisfy the threshold 240, and in the example of FIG. 2, no other data may be stored in the write buffer 210. Additionally, in the example of FIG. 2, the write command 205-*a* may not include (e.g., cause, trigger) the memory system controller to flush (e.g., write, transmit, duplicate) the data 265 to a cursor. As such, in response to the write command 205-*a*, the memory system controller may maintain the data 265 in the write buffer 210 (e.g., the data 265 may temporarily remain in the write buffer 210) and refrain from flushing the data 265 from the write buffer 210 (e.g., due to the data 265 failing to satisfy the threshold 240).

As part of a write operation 255 (e.g., subsequent to the write operation 250), the memory system controller may receive a write command 205-*b* from the host system to write additional data 270 to the memory system. In response to receiving the write command 205-*b*, the memory system controller may store the data 270 to the write buffer 210. In the example of FIG. 2, the write command 205-*b* may include a flush indication (e.g., an FUA field may be set to true, a cache flush indication) or otherwise trigger (e.g., result in or cause a change log checkpoint to update L2P mapping information), the memory system controller to flush data in the write buffer 210 (e.g., the data 265 and the data 270) to non-volatile memory of the memory system (e.g., to a cursor, such as included in a memory device 130). It is noted that in some cases, the memory system controller may receive other write commands 205 before receiving the write command 205-*b* that triggers the flush or the write command 205-*b* may be a first write command (e.g., the write command 205-*a*).

In some cases, the memory system controller may be triggered to flush the data from the write buffer 210 before receiving (e.g., accumulating) sufficient data to satisfy (e.g., meet, exceed) the threshold 240 associated with the TLC cursor 220 (or another multiple-level cell cursor). For example, a quantity of the data 265 and 270 included in the write command 205-*a* and the write command 205-*b*, respectively, and stored to the write buffer 210 may fail to satisfy (e.g., be less than) the threshold 240. In response to being triggered to flush the data from the write buffer 210, the memory system controller may determine whether a quantity of the data in the write buffer 210 satisfies the threshold 240.

In response to the write buffer 210 including insufficient data to satisfy the threshold 240, the memory system controller may flush the contents of the write buffer 210 (e.g., the data 265 and 270) to the small chunk SLC cursor 215 (e.g., instead of to the TLC cursor 220). For example, the small chunk SLC cursor 215 may be associated with a smaller threshold than the threshold 240. That is, the memory system controller may support writing to the small chunk SLC cursor 215 at a smaller granularity relative to the TLC cursor 220, such as at the page 230 level of granularity. As such, the memory system controller may flush the contents of the write buffer 210 (e.g., the data 265 and the data 270) to the small chunk SLC cursor 215 as the flush 225-*a*.

By flushing the data of the write buffer 210 to the small chunk SLC cursor 215 instead of the TLC cursor 220, the memory system controller may avoid writing dummy data to the TLC cursor 220 as part of the flush 225-*a*. For example, if the memory system controller were to instead flush the data to the TLC cursor 220, the memory system may pad the data 265 and 270 with dummy data (e.g., benign data with no useable information, placeholder data) such that the padded data satisfies the threshold 240 and may flush the padded data to the TLC cursor 220. But writing dummy data may reduce storage efficiency and increase wear experienced by the TLC cursor 220. For example, TLCs that may otherwise be used to store actual host data may instead store dummy data, thereby reducing storage efficiency. Additionally, writing dummy data may increase a quantity of write operations on the TLC cursor 220, thereby increasing wear experienced by the TLC cursor 220. Because the memory system controller supports writing data to the small chunk SLC cursor 215 at a smaller granularity, the memory system controller may flush the data to the small chunk SLC cursor 215 without padding the data with dummy data.

The memory system controller may maintain the data 265 and the data 270 in the write buffer 210 after the flush 225-*a*. For example, the flush 225-*a* may be a duplication of the contents of the write buffer 210 to the small chunk SLC cursor. For instance, instead of transferring the data of the write buffer 210 to the small chunk SLC cursor 215 and deleting the contents of the write buffer 210, the memory system controller may duplicate (e.g., copy, write) the contents of the write buffer 210 (e.g., the data 265 and 270) to the pages 230 of the small chunk SLC cursor 215 while maintaining the contents of the write buffer 210 in the write buffer 210.

As part of the flush 225-*a*, the memory system controller (e.g., firmware of the memory system) may record physical addresses (e.g., PPAs) of pages 245 of the TLC cursor 220 to which the data 265 and 270 is to be written (e.g., intended physical addresses of the data 265 and 270) and update an associated small chunk SLC cursor table. For example, as part of the flush 225-*a*, the memory system may record PPAs of the pages 245 of the TLC cursor 220 to in respective spares of the pages 230 (e.g., portions of the pages 230 allocated for metadata) and update the small chunk SLC cursor table in accordance with the recording of the PPAs, as described with reference to FIG. 3. Such PPA recording and small chunk SLC cursor table maintenance may support data recovery in the case of a power loss event (e.g., an APL) and loss of data from the write buffer 210, as described with reference to FIG. 3.

In some cases, additional write commands 205 may be received by the memory system controller (e.g., after the flush 225-*a* and while maintaining the data 265 and 270 in the write buffer 210) including additional data, which may continue to fill the write buffer 210. For example, as part of a write operation 260, the memory system controller may receive a write command 205-*c* from the host system to write additional data 275 to the memory system. In response to receiving the write command 205-*c*, the memory system controller may store the data 275 to the write buffer 210. In the case that the contents of the write buffer 210 have not been deleted (e.g., as a result of an APL), the data 265 and 270 may be maintained in the write buffer 210 and the reception of the write command 205-*c* may result in the write buffer 210 including the data 265, 270, and 275.

In the example of FIG. 2, the write command 205-*c* may contribute enough data to the write buffer 210 such that the threshold 240 may be satisfied, and the memory system controller may flush the contents of the write buffer 210 to the TLC cursor 220. For example, the reception of the write command 205-*c* may result in the quantity of data stored in the write buffer 210 (e.g., a quantity of the data 265, 270, 275) satisfying the threshold 240. In response to the threshold 240 being satisfied, the memory system controller may flush (e.g., write, transfer, transmit, duplicate) the contents of the write buffer 210 to the TLC cursor 220 as the flush 225-*b*. As part of the flush 225-*b*, the memory system controller may write (e.g., duplicate) the data from the write buffer 210 to the pages 245 (e.g., the pagelines 235) of the TLC cursor 220.

After the flush 225-*b*, the memory system controller may subsequently reset the write buffer 210. For example, the memory system controller may delete (e.g., remove) the data 265, 270, and 275 from the write buffer 210 after (e.g., in response to) the flush 225-*b*. In some examples, the memory system controller may erase (e.g., delete the data stored by) the small chunk SLC cursor 215 after the flush 225-*b*, for example, if the small chunk SLC cursor 215 is full. That is, if the each of the pages 230 store data (e.g., there are no empty pages 230 in the small chunk SLC cursor 215) and the data stored by the pages 230 has been written (e.g., flushed, transferred) to one or more TLC cursors 220, the memory system controller may delete the data from the small chunk SLC cursor 215 (e.g., erase the small chunk SLC cursor 215).

In some cases, the write buffer 210 may be cleared or reset before collecting enough data to satisfy the threshold 240 (e.g., before the flush 255-*b*). For example, an APL may occur while the write buffer 210 may still contain data to be written to the TLC cursor 220 (e.g., and previously flushed to the small chunk SLC cursor 215), which may result in data loss (e.g., because of an SRAM reset resulting from the APL). However, the use of the small chunk SLC cursor 215 may support recovery of the lost data. For example, if the APL occurs after the flush 225-*a*, the data stored to the small chunk SLC cursor 215 may be flushed (e.g., moved, transmitted) to the TLC cursor 220, thereby recovering the lost data, as described with reference to FIG. 3.

The memory system controller may update mapping information (e.g., a L2P mapping table) to map logical addresses of the data flushed to the TLC cursor 220 to the physical addresses (e.g., PPAs) of the pages 245 to which the data is written. In some examples, the memory system controller may implement a change log to support updating L2P information. For example, the memory system controller may maintain a change log in volatile memory and add entries to the change log that indicate mappings of logical addresses of data to corresponding physical addresses, such as in association with writing the data to non-volatile memory. Using the change log may enable multiple changes to be made to an L2P table at a time. For example, in response to the change log becoming full of entries (which may be referred to as a change log checkpoint), the memory system controller retrieve one or more portions of the L2P table from non-volatile memory and update the mapping information in accordance with the change log entries.

The small chunk SLC cursor 215 may be a cursor for which no L2P information is generated or maintained. For example, because the data written to the small chunk SLC cursor 215 may be written (e.g., eventually) to the TLC cursor 220, L2P information may instead be generated and maintained for the TLC cursor 220. That is, the memory system controller may not read data from the small chunk SLC cursor 215 in response to a read command from the host system (e.g., instead, the data may be read from the write buffer 210 or the TLC cursor 220). As such, logical addresses of the data may not be mapped to the pages 230 of the small chunk SLC cursor. Accordingly, the memory system controller may refrain from generating L2P mapping information (e.g., adding entries to the change log) that maps logical addresses of the data to physical addresses of the small chunk SLC cursor 215 in association with writing data to the small chunk SLC cursor 215 (e.g., in association with the flush 225-*a*) as L2P information for the small chunk SLC cursor 215 may be unnecessary. Instead, the small chunk SLC cursor 215 may be used to support data recovery in the event of an APL of the memory system (as described with reference to FIG. 3) and to support compliance with a triggering to flush data from the write buffer 210 while avoiding padding the data with dummy data to support flushing the data to the TLC cursor 220.

Additionally, because no L2P information is generated for the small chunk SLC cursor 215, the small chunk SLC cursor 215 may be erased without performing a garbage collect operation. For example, at a time of an erasure of the small chunk SLC cursor 215, the data stored by the small chunk SLC cursor 215 may be entirely stored at one or more TLC cursors 220 and mapping information (e.g., L2P information) may map the data to the pages 245 of the TLC cursors 220. Accordingly, collection of valid data from the small chunk SLC cursor 215 prior to erasure may be unnecessary, and the memory system controller may erase the small chunk SLC cursor 215 without performing a garbage collect operation.

Implementation of the small chunk SLC cursor 215 may also support improved sequential read performance, in some cases. For example, if data is flushed to an SLC cursor and L2P information is generated and maintained for the SLC cursor, the data may remain in the SLC cursor rather than being eventually written to the TLC cursor 220. As a result, respective portions of logically sequential data may be stored in both the SLC cursor and the TLC cursor. But reading data from multiple cursors may be slower than reading data from a single cursor. Accordingly, because no L2P information is maintained for the small chunk SLC cursor and is instead maintained for the TLC cursor 220, data may be sequentially read from a single TLC cursor 220, which may improve read performance (e.g., reduce read latency).

FIG. 3 shows an example of a recovery diagram 300 that supports write buffer flush techniques in accordance with examples as disclosed herein. The recovery diagram 300 may be implemented by aspects of the system 100 or the program diagram 200 as described with reference to FIGS. 1 and 2, or aspects thereof. For example, the recovery diagram 300 may be implemented by a memory system controller, which may be an example of the memory system controller 115 as described with reference to FIG. 1. Additionally, the recovery diagram 300 may include a small chunk SLC cursor 305 and a TLC cursor 325 (e.g., although other types of multiple-level memory cell cursors may be supported), which may be examples of the small chunk SLC cursor 215 and the TLC cursor 220, as described with reference to FIG. 2.

As part of flushing data to the small chunk SLC cursor 305 (as part of a flush 225-*a* described with reference to FIG. 2), the memory system controller may record corresponding PPAs (e.g., physical addresses of pages 360) of the TLC cursor 325 to which the data is to be written in respective small chunk spares 350. For instance, each page 355 of the small chunk SLC cursor 305 may be associated with an SLC PPA 310 (e.g., a physical address of the page 355) and a spare 350, which may be used to store information (e.g., metadata) metadata associated with the data stored by the page 355. For example, the spare 350 of the page 355 associated with the SLC PPA 310-*a* may include a TLC PPA 315-*a* (e.g., a physical address of a page 360) and a logical block address (LBA) 330-*a*. The TLC PPA 315-*a* stored in the spare 350 of the page 355 having the SLC PPA 310-*a* may be an indication of the location (e.g., page 360) in the TLC cursor 325 to which the data stored in the page 355 may be written to (e.g., may be designated for). Similarly, the LBA 330-*a* stored in the spare 350 may be a logical address of the data written to the page 355 having the SLC PPA 310-*a*. That is, as part of writing data to the small chunk SLC cursor 305, the memory system controller may determine the TLC PPAs 315 to which the data is to be written (e.g., eventually, such as part of a flush 225-*b* or a transfer of the data from the small chunk SLC cursor 305 to the TLC cursor 325 as part of a data recovery procedure). The memory system controller may write the data to respective pages 355 of the small chunk SLC cursor 305 and write one or more indications of respective physical addresses of the TLC cursor 325 to which the data is to be written (e.g., TLC PPAs 315) and one or more LBAs of the data to respective spares 350 of the pages 355.

In association with flushing the data to the small chunk SLC cursor 305, the memory system controller may also update a small chunk SLC cursor table 320. The small chunk SLC cursor table 320 may be located within volatile memory (e.g., SRAM, local memory 120) of the memory system controller and may provide a mapping between the SLC PPAs 310 and corresponding TLC PPAs 315. For example, when the memory system controller flushes the contents of the write buffer to the small chunk SLC cursor 305 and records the corresponding TLC PPAs 315 in the spares 350, the memory system controller may also update the small chunk SLC cursor table 320 to reflect the location of the data in the small chunk SLC cursor 305 (e.g., the SLC PPA 310) and the associated location in the TLC cursor 325 to which the data is destined (e.g., the TLC PPA 315). That is, the memory system controller may add one or more entries 365 to the small chunk SLC cursor table 320 that indicate which pages 355 of the small chunk SLC cursor 305 store respective data for which pages 360 of the TLC cursor 325. In the example of FIG. 3, the memory system controller may add an entry 365-*a* that indicates the page 355 having the SLC PPA 310-*a* includes data for the page 360 having PPA 315-*a*, an entry 365-*b* that indicates that page 355 having PPA 310-*b* includes data for the page 360 having PPA 315-*b*, and so on up through an entry 365-*e* that indicates the page 355 having PPA 310-*e* includes data for the page 360 having PPA 315-*e*.

In some cases, the write buffer (e.g., the contents of the write buffer) may be cleared (e.g., erased) before the memory system controller may flush the contents to the TLC cursor 325 (e.g., between a flush 225-*a* and a flush 225-*b*). For example, a power loss event 340 (e.g., an APL) may occur while the write buffer and the small chunk SLC cursor 305 may still contain data to be written to the TLC cursor 325, which may result in loss of the contents (e.g., entries 365) of the small chunk SLC cursor table 320 and the write buffer. That is, because the small chunk SLC cursor table 320 and the write buffer may be located (e.g., stored, maintained) in the volatile memory of the memory system, the power loss event 340 may result in the erasure of the data stored in the small chunk SLC cursor table 320 and the write buffer.

The small chunk SLC cursor 305 may be used to rebuild the small chunk SLC cursor table 320 after a power on event 345 (e.g., subsequent to the power loss event 340) such that the data flushed to the small chunk SLC cursor 305 may be recovered and written (e.g., transferred) to the TLC cursor 325. For example, after the power on event 345, the memory system controller may read the pages 355 having SLC PPAs 310-*a* through 310-*e* from the small chunk SLC cursor 305 and the corresponding TLC PPAs 315 from the corresponding spares 350 of the small chunk SLC cursor 305. The memory system controller may generate (e.g., rebuild) the small chunk SLC cursor table 320 using the retrieved SLC PPAs 310 and the TLC PPAs 315 by adding (e.g., re-adding) the entries 365-*a* through 365-*e* to the small chunk SLC cursor table 320.

The memory system controller may use the rebuilt small chunk SLC cursor table 320 and the small chunk SLC cursor 305 to recover data lost from the write buffer as a result of the power loss event 340. For example, the small chunk SLC cursor 305 and the small chunk SLC cursor table 320 may be used to add entries with L2P mapping information to the change log 335 after the power on event 345. For instance, after the power on event 345, the memory system controller access the small chunk SLC cursor table 320 to determine for which pages 360 the small chunk SLC cursor 305 stored corresponding data. The memory system controller may read the LBAs 330 from the spare 350 of the small chunk SLC cursor 305 to determine the logical addresses of the data stored by the pages 355. The memory system controller may add entries 370 to (e.g., rebuild) the change log 335 using the TLC PPAs 315 and the LBAs 330. For example, the spares 350 may include the mapping information of the LBAs 330 to the TLC PPAs 315. Accordingly, the memory system controller may add entries 370 (e.g., entries 370-*a* through 370-*e*) that indicate L2P mapping information of respective LBAs 330 to TLC PPAs 315. The memory system controller may subsequently update an L2P table with the updated mapping information in accordance with the change log 335. Thus, the small chunk SLC cursor 305 may be used to recover the data lost in the power loss event 340 by adding entries 370 to the change log 335.

The memory system controller may access the data of the small chunk SLC cursor 305 and may transfer the data to the TLC cursor 325. For example, the memory system controller may read the data stored in the small chunk SLC cursor 305 (e.g., the pages 355 having PPAs 310-*a* to 310-*e*) and write the data to the TLC cursor 325 in accordance with the LBA 330 to TLC PPA 315 mapping (e.g., to the corresponding pages 360 having PPAs 315-*a* to 315-*e*). In some examples, the memory system controller may pad the data transferred to the TLC cursor 325 with dummy data if a quantity of the data to be transferred fails to satisfy a threshold (e.g., the threshold 240), such as in accordance with a write granularity supported by the TLC cursor 325. As such, the use of the small chunk SLC cursor 305 may support recovery of lost data.

In some cases, use of the small chunk SLC cursor 305 may allow the memory system to refrain from generating L2P mapping information for the small chunk SLC cursor 305. For example, because the memory system (e.g., the memory system firmware) stores the TLC PPA 315 to the spares 350 of the pages 355 and because the collected data is later flushed to the TLC cursor 325, the memory system may not generate mapping information for the small chunk SLC cursor 305. In some cases, this (e.g., the memory system not generating small chunk SLC cursor 305 mapping information) may support improved sequential read performance. For example, the L2P mapping information (e.g., associated with the data) stored in the change log 335 (e.g., and L2P table) may point to the TLC cursor 325. Thus, the memory system may read one cursor (e.g., the TLC cursor 325) instead of more than one cursor, which may result in improved sequential read performance of the memory system.

Figure 4:
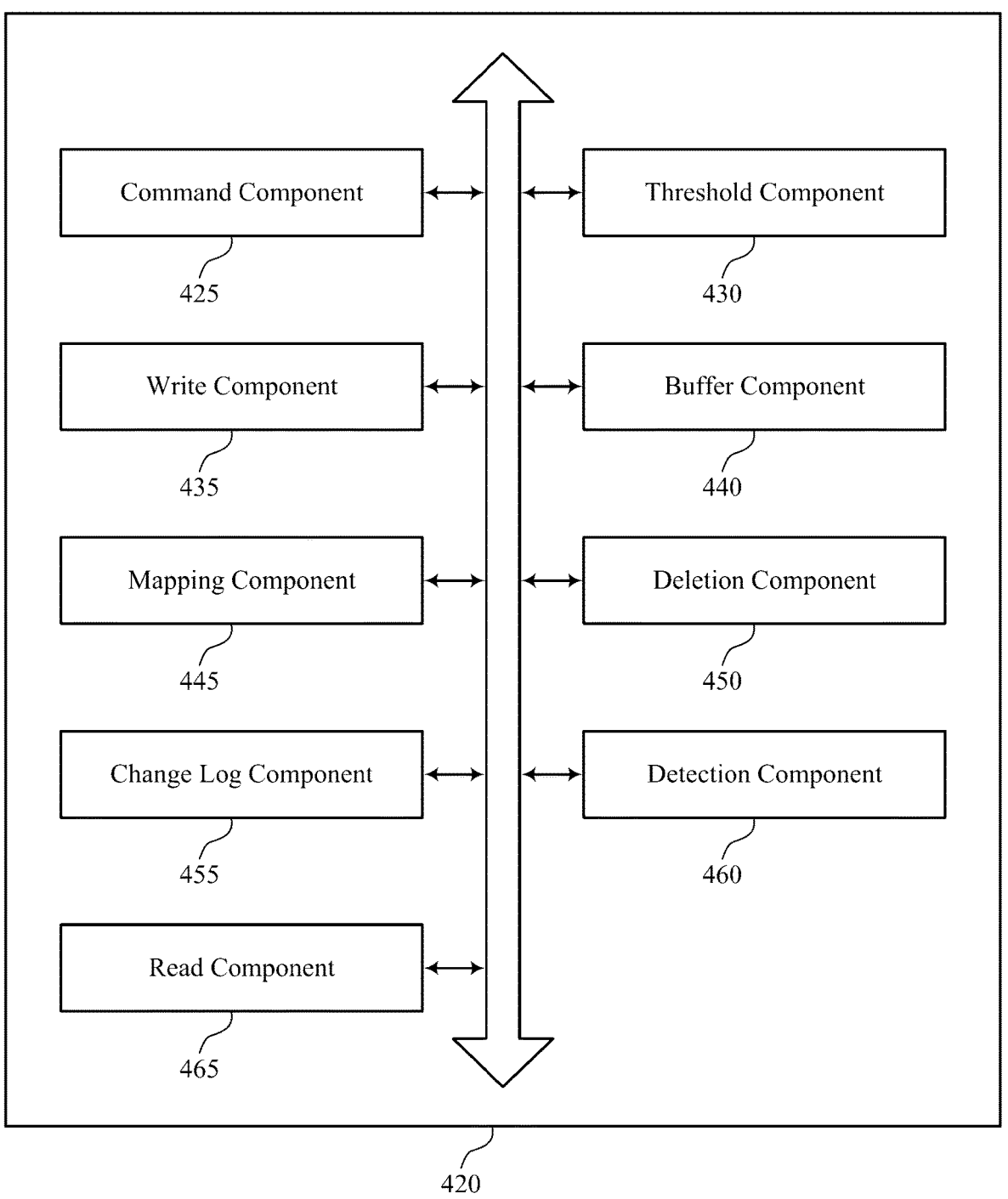
FIG. 4 shows an example of a block diagram that supports write buffer flush techniques in accordance with examples as disclosed herein.

FIG. 4 shows a block diagram 400 of a memory system 420 that supports write buffer flush techniques in accordance with examples as disclosed herein. The memory system 420 may be an example of aspects of a memory system as described with reference to FIGS. 1 through 3. The memory system 420, or various components thereof, may be an example of means for performing various aspects of write buffer flush techniques as described herein. For example, the memory system 420 may include a command component 425, a threshold component 430, a write component 435, a buffer component 440, a mapping component 445, a deletion component 450, a change log component 455, a detection component 460, a read component 465, or any combination thereof. Each of these components may communicate, directly or indirectly, with one another (e.g., via one or more buses).

The command component 425 may be configured as or otherwise support a means for receiving one or more commands to write data to a memory system (e.g., the memory system 420), a command of the one or more commands triggering a transfer of the data from a volatile memory device of the memory system to a non-volatile memory device of the memory system. The threshold component 430 may be configured as or otherwise support a means for determining whether a quantity of the data to transfer to the non-volatile memory device satisfies a threshold associated with writing the data to a first block of the memory system that includes multiple-level memory cells. The write component 435 may be configured as or otherwise support a means for writing, based at least in part on the quantity of data failing to satisfy the threshold, the data to a second block of the memory system that includes SLCs.

In some examples, the buffer component 440 may be configured as or otherwise support a means for maintaining, based at least in part on the quantity of data failing to satisfy the threshold, the data in the volatile memory device after writing the data to the second block.

In some examples, the command component 425 may be configured as or otherwise support a means for receiving, after writing the data to the second block, one or more second commands to write second data to the memory system. In some examples, the threshold component 430 may be configured as or otherwise support a means for determining, based at least in part on receiving the second data, that a quantity of the data and the second data satisfy the threshold. In some examples, the write component 435 may be configured as or otherwise support a means for writing, based at least in part on the quantity of the data and the second data satisfying the threshold, the data and the second data to the first block.

In some examples, the deletion component 450 may be configured as or otherwise support a means for deleting, after writing the data and the second data to the first block and based at least in part on the second block being full, the data from the second block.

In some examples, the buffer component 440 may be configured as or otherwise support a means for maintaining, based at least in part on the quantity of data failing to satisfy the threshold, the data in the volatile memory device after writing the data to the second block. In some examples, the buffer component 440 may be configured as or otherwise support a means for deleting, after writing the data and the second data to the first block, the data and the second data from the volatile memory device.

In some examples, to support writing the data to the second block, the write component 435 may be configured as or otherwise support a means for writing the data to one or more pages of the second block. In some examples, to support writing the data to the second block, the write component 435 may be configured as or otherwise support a means for writing, to the one or more pages of the second block, one or more indications of respective physical addresses of one or more pages of the first block to which the data is to be written.

In some examples, the detection component 460 may be configured as or otherwise support a means for detecting, after writing the data to the second block, a power loss event of the memory system. In some examples, the read component 465 may be configured as or otherwise support a means for reading, based at least in part on detecting the power loss event, the one or more pages of the second block to determine the respective physical addresses of the one or more pages of the first block. In some examples, the mapping component 445 may be configured as or otherwise support a means for generating, based at least in part on reading the one or more pages of the second block, a table indicating which pages of the one or more pages of the second block store respective data for which pages of the one or more pages of the first block.

In some examples, the change log component 455 may be configured as or otherwise support a means for adding, in accordance with the table, one or more entries to a change log of the memory system, each entry added to the change log indicating logical-to-physical mapping information of a respective portion of the data to one or more pages of the one or more pages of the first block. In some examples, the write component 435 may be configured as or otherwise support a means for transferring, in accordance with the table, the data from the one or more pages of the second block to the one or more pages of the first block.

In some examples, the mapping component 445 may be configured as or otherwise support a means for adding, in accordance with the respective physical addresses of the one or more pages of the first block to which the data is to be written, one or more entries to a table indicating which pages of the one or more pages of the second block store respective data for which pages of the one or more pages of the first block.

In some examples, the mapping component 445 may be configured as or otherwise support a means for refraining, in association with writing the data to the second block, from generating mapping information that maps respective logical addresses of the data to respective physical addresses of the second block to which the data is written.

In some examples, the first block is a TLC cursor and the second block is a SLC cursor.

In some examples, the threshold corresponds to a quantity data storable by a quantity of pagelines of the first block.

In some examples, the threshold is a minimum quantity of data that is transferrable to the first block per transfer from the volatile memory device.

FIG. 5 shows a flowchart illustrating a method 500 that supports write buffer flush techniques in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving one or more commands to write data to a memory system, a command of the one or more commands triggering a transfer of the data from a volatile memory device of the memory system to a non-volatile memory device of the memory system. The operations of 505 may be performed in accordance with examples as disclosed herein. In some examples, aspects of the operations of 505 may be performed by a command component 425 as described with reference to FIG. 4.

At 510, the method may include determining whether a quantity of the data to transfer to the non-volatile memory device satisfies a threshold associated with writing the data to a first block of the memory system that includes multiple-level memory cells. The operations of 510 may be performed in accordance with examples as disclosed herein. In some examples, aspects of the operations of 510 may be performed by a threshold component 430 as described with reference to FIG. 4.

At 515, the method may include writing, based at least in part on the quantity of data failing to satisfy the threshold, the data to a second block of the memory system that includes SLCs. The operations of 515 may be performed in accordance with examples as disclosed herein. In some examples, aspects of the operations of 515 may be performed by a write component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving one or more commands to write data to a memory system, a command of the one or more commands triggering a transfer of the data from a volatile memory device of the memory system to a non-volatile memory device of the memory system; determining whether a quantity of the data to transfer to the non-volatile memory device satisfies a threshold associated with writing the data to a first block of the memory system that includes multiple-level memory cells; and writing, based at least in part on the quantity of data failing to satisfy the threshold, the data to a second block of the memory system that includes SLCs.

Aspect 2: The method, apparatus, or non-transitory computer-readable medium of aspect 1, further including operations, features, circuitry, logic, means, or instructions, or any combination thereof for maintaining, based at least in part on the quantity of data failing to satisfy the threshold, the data in the volatile memory device after writing the data to the second block.

Aspect 3: The method, apparatus, or non-transitory computer-readable medium of any of aspects 1 through 2, further including operations, features, circuitry, logic, means, or instructions, or any combination thereof for receiving, after writing the data to the second block, one or more second commands to write second data to the memory system; determining, based at least in part on receiving the second data, that a quantity of the data and the second data satisfy the threshold; and writing, based at least in part on the quantity of the data and the second data satisfying the threshold, the data and the second data to the first block.

Aspect 4: The method, apparatus, or non-transitory computer-readable medium of aspect 3, further including operations, features, circuitry, logic, means, or instructions, or any combination thereof for deleting, after writing the data and the second data to the first block and based at least in part on the second block being full, the data from the second block.

Aspect 5: The method, apparatus, or non-transitory computer-readable medium of any of aspects 3 through 4, further including operations, features, circuitry, logic, means, or instructions, or any combination thereof for maintaining, based at least in part on the quantity of data failing to satisfy the threshold, the data in the volatile memory device after writing the data to the second block and deleting, after writing the data and the second data to the first block, the data and the second data from the volatile memory device.

Aspect 6: The method, apparatus, or non-transitory computer-readable medium of any of aspects 1 through 5, where writing the data to the second block includes operations, features, circuitry, logic, means, or instructions, or any combination thereof for writing the data to one or more pages of the second block and writing, to the one or more pages of the second block, one or more indications of respective physical addresses of one or more pages of the first block to which the data is to be written.

Aspect 7: The method, apparatus, or non-transitory computer-readable medium of aspect 6, further including operations, features, circuitry, logic, means, or instructions, or any combination thereof for detecting, after writing the data to the second block, a power loss event of the memory system; reading, based at least in part on detecting the power loss event, the one or more pages of the second block to determine the respective physical addresses of the one or more pages of the first block; and generating, based at least in part on reading the one or more pages of the second block, a table indicating which pages of the one or more pages of the second block store respective data for which pages of the one or more pages of the first block.

Aspect 8: The method, apparatus, or non-transitory computer-readable medium of aspect 7, further including operations, features, circuitry, logic, means, or instructions, or any combination thereof for adding, in accordance with the table, one or more entries to a change log of the memory system, each entry added to the change log indicating logical-to-physical mapping information of a respective portion of the data to one or more pages of the one or more pages of the first block and transferring, in accordance with the table, the data from the one or more pages of the second block to the one or more pages of the first block.

Aspect 9: The method, apparatus, or non-transitory computer-readable medium of any of aspects 6 through 8, further including operations, features, circuitry, logic, means, or instructions, or any combination thereof for adding, in accordance with the respective physical addresses of the one or more pages of the first block to which the data is to be written, one or more entries to a table indicating which pages of the one or more pages of the second block store respective data for which pages of the one or more pages of the first block.

Aspect 10: The method, apparatus, or non-transitory computer-readable medium of any of aspects 1 through 9, further including operations, features, circuitry, logic, means, or instructions, or any combination thereof for refraining, in association with writing the data to the second block, from generating mapping information that maps respective logical addresses of the data to respective physical addresses of the second block to which the data is written.

Aspect 11: The method, apparatus, or non-transitory computer-readable medium of any of aspects 1 through 10, where the first block is a TLC cursor and the second block is a SLC cursor.

Aspect 12: The method, apparatus, or non-transitory computer-readable medium of any of aspects 1 through 11, where the threshold corresponds to a quantity data storable by a quantity of pagelines of the first block.

Aspect 13: The method, apparatus, or non-transitory computer-readable medium of any of aspects 1 through 12, where the threshold is a minimum quantity of data that is transferrable to the first block per transfer from the volatile memory device.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a non-volatile memory device;
a volatile memory device; and
a controller coupled with the non-volatile memory device and the volatile memory device, wherein the controller is configured to cause the apparatus to:
receive one or more commands to write data to the apparatus, a command of the one or more commands triggering a transfer of the data from the volatile memory device to the non-volatile memory device;
determine whether a quantity of the data to transfer to the non-volatile memory device satisfies a threshold associated with writing the data to a first block of the apparatus that comprises multiple-level memory cells; and
write, based at least in part on the quantity of data failing to satisfy the threshold, the data and an indication of one or more physical addresses of the first block to a second block of the apparatus that comprises single-level memory cells, wherein the one or more physical addresses for which the indication is written to the second block correspond to one or more pages of the first block to which the data is to subsequently be written.

2. The apparatus of claim 1, wherein the controller is further configured to cause the apparatus to:
maintain, based at least in part on the quantity of data failing to satisfy the threshold, the data in the volatile memory device after writing the data to the second block.

3. The apparatus of claim 1, wherein the controller is further configured to cause the apparatus to:
receive, after writing the data to the second block, one or more second commands to write second data to the apparatus;
determine, based at least in part on receiving the second data, that a quantity of the data and the second data satisfy the threshold; and
write, based at least in part on the quantity of the data and the second data satisfying the threshold, the data and the second data to the first block.

4. The apparatus of claim 3, wherein the controller is further configured to cause the apparatus to:
delete, after writing the data and the second data to the first block and based at least in part on the second block being full, the data from the second block.

5. The apparatus of claim 3, wherein the controller is further configured to cause the apparatus to:
maintain, based at least in part on the quantity of data failing to satisfy the threshold, the data in the volatile memory device after writing the data to the second block; and delete, after writing the data and the second data to the first block, the data and the second data from the volatile memory device.

6. The apparatus of claim 1, wherein the controller is further configured to cause the apparatus to:

detect, after writing the data to the second block, a power loss event of the apparatus;

read, based at least in part on detecting the power loss event, the one or more pages of the second block to determine the one or more physical addresses of the one or more pages of the first block to which the data is to subsequently be written; and generate, based at least in part on reading the one or more pages of the second block, a table indicating which pages of the one or more pages of the second block store respective data for which pages of the one or more pages of the first block.

7. The apparatus of claim 6, wherein the controller is further configured to cause the apparatus to:

add, in accordance with the table, one or more entries to a change log of the apparatus, each entry added to the change log indicating logical-to-physical mapping information of a respective portion of the data to one or more pages of the one or more pages of the first block; and transfer, in accordance with the table, the data from the one or more pages of the second block to the one or more pages of the first block.

8. The apparatus of claim 1, wherein the controller is further configured to cause the apparatus to:

add, in accordance with the one or more physical addresses of the one or more pages of the first block to which the data is to be subsequently written, one or more entries to a table indicating which pages of the one or more pages of the second block store respective data for which pages of the one or more pages of the first block.

9. The apparatus of claim 1, wherein the controller is further configured to cause the apparatus to:

refrain, in association with writing the data to the second block, from generating mapping information that maps respective logical addresses of the data to respective physical addresses of the second block to which the data is written.

10. The apparatus of claim 1, wherein the first block is a tri-level cell (TLC) cursor and the second block is a single level cell (SLC) cursor.

11. The apparatus of claim 1, wherein the threshold corresponds to a quantity data storable by a quantity of pagelines of the first block.

12. The apparatus of claim 1, wherein the threshold is a minimum quantity of data that is transferrable to the first block per transfer from the volatile memory device.

13. A non-transitory computer-readable medium storing code comprising instructions which, when executed by a processor of an electronic device, cause the electronic device to:

receive one or more commands to write data to a memory system, a command of the one or more commands triggering a transfer of the data from a volatile memory device of the memory system to a non-volatile memory device of the memory system;

determine whether a quantity of the data to transfer to the non-volatile memory device satisfies a threshold associated with writing the data to a first block of the memory system that comprises multiple-level memory cells; and write, based at least in part on the quantity of data failing to satisfy the threshold, the data and an indication of one or more physical addresses of the first block to a second block of the electronic device that comprises single-level memory cells, wherein the one or more physical addresses for which the indication is written to the second block correspond to one or more pages of the first block to which the data is to be subsequently written.

14. The non-transitory computer-readable medium of claim 13, wherein the instructions, when executed by the processor of the electronic device, further cause the electronic device to:

maintain, based at least in part on the quantity of data failing to satisfy the threshold, the data in the volatile memory device after writing the data to the second block.

15. The non-transitory computer-readable medium of claim 13, wherein the instructions, when executed by the processor of the electronic device, further cause the electronic device to:

receive, after writing the data to the second block, one or more second commands to write second data to the memory system;

determine, based at least in part on receiving the second data, that a quantity of the data and the second data satisfy the threshold; and write, based at least in part on the quantity of the data and the second data satisfying the threshold, the data and the second data to the first block.

16. The non-transitory computer-readable medium of claim 13, wherein the instructions, when executed by the processor of the electronic device, further cause the electronic device to:

detect, after writing the data to the second block, a power loss event of the memory system;

read, based at least in part on detecting the power loss event, the one or more pages of the second block to determine the one or more physical addresses of the one or more pages of the first block to which the data is to subsequently be written; and generate, based at least in part on reading the one or more pages of the second block, a table indicating which pages of the one or more pages of the second block store respective data for which pages of the one or more pages of the first block.

17. The non-transitory computer-readable medium of claim 16, wherein the instructions, when executed by the processor of the electronic device, further cause the electronic device to:

add, in accordance with the table, one or more entries to a change log of the memory system, each entry added to the change log indicating logical-to-physical mapping information of a respective portion of the data to one or more pages of the one or more pages of the first block; and transfer, in accordance with the table, the data from the one or more pages of the second block to the one or more pages of the first block.

18. A method, comprising:

receiving one or more commands to write data to a memory system, a command of the one or more commands triggering a transfer of the data from a volatile memory device of the memory system to a non-volatile memory device of the memory system;

determining whether a quantity of the data to transfer to the non-volatile memory device satisfies a threshold associated with writing the data to a first block of the memory system that comprises multiple-level memory cells; and writing, based at least in part on the quantity of data failing to satisfy the threshold, the data and an indication of one or more physical addresses of the first block to a second block of the memory system that comprises single-level memory cells, wherein the one or more physical addresses for which the indication is written to the second block correspond to one or more pages of the first block to which the data is to be subsequently written.

*     *     *     *     *